United States Patent [19]

Hasegawa et al.

[11] Patent Number: 5,053,257

[45] Date of Patent: Oct. 1, 1991

[54] PROCESS FOR FORMING FILM OF HYDROLYZED ETHYLENE-VINYL ACETATE COPOLYMER

[75] Inventors: Kenji Hasegawa, Takatsuki; Teruo Iwanami, Ibaraki; Shinji Miyake, Osaka, all of Japan

[73] Assignee: Nippon Gohsei Kagaku Kogyo Kabushiki Kaisha, Osaka, Japan

[21] Appl. No.: 483,682

[22] Filed: Feb. 23, 1990

[30] Foreign Application Priority Data

Feb. 27, 1989 [JP] Japan ................................. 1-48059

[51] Int. Cl.$^5$ .............................................. B05D 3/02
[52] U.S. Cl. .................................. 427/379; 427/385.5
[58] Field of Search .................. 427/379, 385.5, 388.4, 427/391, 393.5, 409, 411, 412.2, 412.3, 412.5

[56] References Cited

U.S. PATENT DOCUMENTS 3,908,066  9/1975  Parkinson ........................... 427/388.4
4,487,789 12/1984  Iwanami ............................. 427/407.1
4,812,327  3/1989  Hanazana et al. ................. 427/388.4

FOREIGN PATENT DOCUMENTS 46-23911  7/1971  Japan .
47-48489 12/1972  Japan .

*Primary Examiner*—Michael Lusignan
*Attorney, Agent, or Firm*—Armstrong, Nikaido, Marmelstein, Kubovcik & Murray

[57] ABSTRACT

A process for forming a film of a hydrolyzed ethylene-vinyl acetate copolymer which comprises:
coating a solution comprising a hydrolyzed ethylene-vinyl
acetate copolymer to a substrate,
drying the wet film and
subjecting the dried film to heat-treatment,
said obtained film being formed so as to have a ratio of absorbance at 1140 cm$^{-1}$ to absorbance at 1090 cm$^{-1}$ in infrared absorption spectrum of not less than 0.65. According to the process of the present invention, the hydrolyzed ethylene-vinyl acetate copolymer film having excellent oxygen impermeability can be obtained.

3 Claims, No Drawings

PROCESS FOR FORMING FILM OF HYDROLYZED ETHYLENE-VINYL ACETATE COPOLYMER

BACKGROUND OF THE INVENTION

The present invention relates to a process for forming a film of a hydrolyzed ethylene-vinyl acetate copolymer, and more particularly to a forming process of a hydrolyzed ethylene-vinyl acetate copolymer film which is provided on a surface of various plastics to give high oxygen impermeability.

A film prepared from a hydrolyzed ethylene-vinyl acetate copolymer is excellent in transparence, oxygen impermeability, and the like. So, the film is useful as various wrapping or packaging materials for foods, medical supplies, chemicals, and the like. Also, its laminate with a plastic film, a paper, a metal foil, or the like is usefully utilized.

The film of the hydrolyzed copolymer can be formed in any method. Among the various forming methods, a solution-coating method wherein a solution of the hydrolyzed ethylene-vinyl acetate copolymer dissolved in a solvent is coated on a substrate has been watched, because according to the solution-coating method, the obtained films are relatively thin in thickness, the films can be easily formed on a substrate having a complex shape such as a hollow vessel, and the coating operation can be conducted by using relatively easy painting appliances. As a solvent of the hydrolyzed copolymer used in the solution-coating method, various solvents have been proposed, and a water-containing propyl alcohol and a water-containing butyl alcohol, which are described in, for instance, Japanese Examined Patent Publication No. 46-23911 and No. 47-48489, are hopeful, since a transparent film can be obtained by using such solvents.

However, when the film is prepared from the hydrolyzed copolymer, using the above-mentioned water-containing alcohol solvent, in order to obtain a film having excellent transparence, it is required to keep a temperature of the coating solution high, i.e. 50° C. in coating operation. Also, the coating solution is poor in storage stability, and it is difficult to obtain a microscopically uniform film which is excellent in film properties such as transparence and gas impermeability so far as the film is obtained by coating the solution and drying it. Accordingly, the above-mentioned method cannot sufficiently meet recent, severe requirements to qualities, and it is further required that the film properties are more improved.

In order to improve the above-mentioned defects, it has been proposed to use a solvent wherein formic acid is added to a water-containing alcohol solvent in a small amount. However, the recent, technological innovation requires to have higher properties to the films. For instance, it is required that even if the film thickness of the hydrolyzed ethylene-vinyl acetate copolymer is made thin, the oxygen impermeability is not lowered, that is, it is required that the oxygen impermeability of the film is more improved.

An object of the invention is to provide a process for forming films of hydrolyzed ethylene-vinyl acetate copolymers having more improved properties, particularly higher oxygen impermeability.

This and the other objects of the present invention will become apparent from the description hereinafter.

SUMMARY OF THE INVENTION

In accordance with the present invention, there is provided a process for forming a film of a hydrolyzed ethylene-vinyl acetate copolymer which comprises:
coating a solution comprising a hydrolyzed ethylene-vinyl acetate copolymer to a substrate,
drying the wet film and
subjecting the dried film to heat-treatment,
said obtained film being formed so as to have a ratio of absorbance at 1,140 cm$^{-1}$ to absorbance at 1,090 cm$^{-1}$ in infrared absorption spectrum of not less than 0.65.

According to the film forming process as mentioned above, the object of the present invention can be attained. Further, the desired hydrolyzed ethylene-vinyl acetate copolymer film as mentioned above can be easily obtained by coating the solution comprising the hydrolyzed ethylene-vinyl acetate copolymer to the substrate, then drying the wet film at 60° to 150° C. and heat-treating the dried film at a temperature that is not less than 20° C. higher than the drying temperature.

DETAILED DESCRIPTION

The hydrolyzed ethylene-vinyl acetate copolymer used in the present invention has an ethylene content of 25 to 55% by mole, preferably from 28 to 48% by mole and a degree of hydrolysis in vinyl acetate units of at least 90% by mole, preferably at least 95% by mole. When the ethylene content is less than 25% by mole, the gas impermeability is lowered under high humidity. On the other hand, when the ethylene content is more than 55% by mole, film properties such as gas impermeability and printability are deteriorated. Also, when the degree of hydrolysis is less than 90% by mole, the gas impermeability and humidity resistance are lowered.

The hydrolyzed copolymer may further contain a small amount of comonomers, for instance, an α-olefins such as propylene, isobutene, α-octene, α-dodecene and α-octadecene, unsaturated carboxylic acids and their salts, partial alkyl esters, complete alkyl esters, nitriles, amides and anhydrides, unsaturated sulfonic acid and their salts, and the like.

In the present invention, as a solvent of the hydrolyzed copolymer, a mixture of (A) 30 to 70% by weight of water and (B) 70 to 30% by weight of an alcohol is used. As the alcohol, particularly, there are preferable a propyl alcohol and at least one alcohol selected from a butyl alcohol, a methyl alcohol and an ethyl alcohol. The amount of water (A) is from 30 to 70% by weight, preferably from 40 to 60% by weight. When the amount of the component (A), water is less than 30% by weight or is more than 70% by weight, it is difficult to obtain a uniform solution, so the obtained film is cloudy. As the propyl alcohol in the component (B), n-propyl alcohol and iso-propyl alcohol are exemplified. As the butyl alcohol, there are exemplified n-butyl alcohol, iso-butyl alcohol, sec-butyl alcohol, tert-butyl alcohol, and the like. There is preferably used iso-propyl alcohol.

The concentration of the hydrolyzed ethylene-vinyl acetate copolymer solution is not particularly limited, and the solution can be used in any concentration range. Usually, the concentration is from 0.5 to 25% by weight.

In the present invention, substrates to be coated with the hydrolyzed ethylene-vinyl acetate copolymer solution are not particularly limited. Examples of the substrate are, for instance, films, sheets and hollow containers of various plastics such as polyethylene, polypropylene, polyester, polystyrene and polyvinyl chloride; papers, cellophane (regenerated cellulose film), cellulose acetate, natural rubber, synthetic rubber, metals, and the like.

It is suitable that the thickness of the substrate is from about 10 to 1,000 μm.

It is general that the film formed according to the present invention is practically used in the form of a laminate, that is, the laminate obtained by coating the hydrolyzed ethylene-vinyl acetate copolymer solution on the substrate as it is, as the wrapping or packaging materials. If necessary, the film can be used in the form of a mono-layer film or sheet obtained by peeling off it from the substrate.

The solution of the hydrolyzed copolymer can be coated on the substrate in any known manner such as roller coating, spray coating or dip coating.

Also, the surface of the substrate can be suitably subjected to oxidation treatment, flame treatment, anchor coating treatment, primer treatment, and the like depending on the kind of the used substrate in order to improve the adhesion between the hydrolyzed ethylene-vinyl acetate copolymer layer and the substrate. Polyurethane compounds and polyester-isocyanate compounds can be preferably utilized as the anchor coating agent. It is practical that the thickness of the anchor coat layer is from about 0.05 to 3 μm.

After coating the hydrolyzed ethylene-vinyl acetate copolymer solution on the substrate, the wet film is dried. That is, the film is dried by heating at a temperature of 60° to 150° C., preferably from about 70° to 20° C. for 3 seconds to 5 minutes. Volatile matter contained in the wet film, i.e., water and the alcohols are removed during drying. The film is dried until the volatile matter content is not more than 2% by weight.

Subsequently, the dried film is subjected to heat-treatment at a temperature that is not less than 20° C. higher than the drying temperature, usually at a temperature of about 100° to 170° C., for, usually, 1 to 60 seconds, whereby the desired film can be formed.

The film of the hydrolyzed ethylene-vinyl acetate copolymer is formed so as to get a ratio of absorbance at 1,140 $cm^{-1}$ to absorbance at 1,090 $cm^{-1}$ in infrared absorption spectrum of the obtained film being not less than 0.65, preferably from 0.70 to 1.30. In infrared absorption spectrum, a crystalline band of hydrolyzed ethylene-vinyl acetate copolymer films appears at 1,140 $cm^{-1}$, and on the other hand, an absorption based on the stretching vibration of C=O appears at 1,090 $cm^{-1}$. The film forming process of the present invention is a process for forming the hydrolyzed copolymer films having the ratio of absorbance at 1,140 $cm^{-1}$ to absorbance at 1,090 $cm^{-1}$, of not less than 0.65, preferably 0.70 to 1.30, in other words, having the improved crystallinity. Such hydrolyzed copolymer film has remarkably improved oxygen imparmeability.

Thus, the transparent films of the hydrolyzed ethylene-vinyl acetate copolymer are formed. It is practical that the hydrolyzed copolymer film thickness is about from 0.5 to 15 μm. When the film thickness is less than 0.5 μm, it is difficult to exhibit the sufficient gas impermeability. On the other hand, when the film thickness is more than 15 μm, it is difficult to obtain uniform films.

If necessary, it is possible to form a moisture-proof layer on the hydrolyzed ethylene-vinyl acetate copolymer coating film. For instance, vinylidene chloride resin coatings, vinyl chloride-vinyl acetate copolymer coatings, or the like are coated to form the moisture-proof layer on the hydrolyzed copolymer coating film.

The films formed according to the present invention include not only mono-layer films or sheets of the hydrolyzed ethylene-vinyl acetate copolymer but also laminates wherein the hydrolyzed copolymer coating film is laminated on the substrate such as a polyester or polyolefin. The films are useful as the wrapping or packaging materials or containers for foods, drinks, chemicals, medicines, and the like. The film can be utilized in any state such as a film, sheet, hollow container and tube.

According to the present invention, the film of the hydrolyzed ethylene-vinyl acetate copolymer having the extremely improved oxygen impermeability can be formed by coating the solution of the hydrolyzed copolymer on the substrate, drying the wet film and heat-treating the dried film.

The present invention is more specifically described and explained by means of the following Examples and Comparative Examples in which all per cents and parts are by weight unless otherwise noted. It is to be understood that the present invention is not limited to the Examples, and various changes and modifications may be made in the invention without departing from the spirit and scope thereof.

EXAMPLE 1

To 82 parts of a mixed solvent of 50% water and 50% iso-propyl alcohol was added 18 parts of a hydrolyzed ethylene-vinyl acetate copolymer having an ethylene content of 30% by mole and a degree of hydrolysis of 99.5% by mole, and the mixture was stirred at a temperature of 60° to 70° C. for about 2 hours to give a transparent solution.

On the other hand, a polyethylene terephthalate film with a thickness of 50 μm was subjected to anchor coating treatment, using a polyurethane compound solution comprising 100 parts of a polyurethane adhesive, 6.5 parts of a curing agent and 900 parts of ethyl acetate to give an anchor coat with a thickness of 1.5 μm.

Thus treated film (substrate) was dipped in the solution of the hydrolyzed copolymer as prepared above having a temperature of 30° C. for 5 seconds and it was pulled off. Immediately, the wet film was dried at 100° C. for 5 minutes, then was subjected to heat-treatment at 140° C. for 20 seconds to give a hydrolyzed ethylene-vinyl acetate copolymer coating film having a thickness of 4 μm on the substrate.

A ratio of absorbance at 1,140 $cm^{-1}$ to absorbance at 1,090 $cm^{-1}$ in infrared absorption spectrum (hereinafter referred to as "$D_{1140}/D_{1090}$") as to the obtained hydrolyzed ethylene vinyl acetate copolymer coating film was measured according to JIS (Japanese Industrial Standards) K 0117.

Also, Haze value of the laminate was measured according to ASTM (American Society for Testing Materials) D 1003-52 as the transparence.

Further, oxygen transmittancy [cc(NTP)/$m^2$.24hr.atm] of the laminate was measured according to ASTM D 1434-58.

The results are shown in Table 2.

EXAMPLES 2–8 AND COMPARATIVE EXAMPLE 1

The procedure of Example 1 was repeated except that a hydrolyzed ethylene-vinyl acetate copolymer as shown in Table 1 was coated on a substrate as shown in Table 1 treated with an anchor coat (the kind and thickness be shown in Table 1) under conditions as shown in Table 1 (kind of solvent and concentration of the coating solution and coating means), and the film was dried and heat-treated under conditions as shown in Table 1.

As to the obtained hydrolyzed ethylene-vinyl acetate copolymer coating film, the $D_{1140}/D_{1090}$, and as to the laminate, Haze value and oxygen transmittancy were measured in the same manner as in Example 1.

The results are shown in Table 2.

The oxygen transmittancy [cc(NTP)/m$^2$.24hr.atm] of used substrates are as follows:

OPP (biaxially stretched polypropylene) film with a thickness of 60 μm: 800
O-Ny (biaxially stretched polyamide-6) film with a thickness of 20 μm: 26
PET (polyethylene terephtharate) bottle with a thickness of 300 μm: 5.5
O-PET (biaxially stretched polyethylene terephtharate) film with a thickness of 100 μm : 12.0
PP (polypropylene) bottle with a thickness of 500 μm: 205

TABLE 1

| | Structure of laminate | | | | | | |
|---|---|---|---|---|---|---|---|
| | Substrate | | Anchor coat | | Hydrolyzed ethylene-vinyl acetate copolymer layer | | |
| Ex. No. | Kind | Thickness (μm) | Kind | Thickness (μm) | Ethylene content (% by mole) | Degree of hydrolysis (% by mole) | Thickness (μm) |
| 1 | O-PET film | 20 | Polyurethane anchor coat | 1.5 | 30 | 99.5 | 4 |
| 2 | OPP film | 30 | Polyurethane anchor coat | 2 | 37 | 99.5 | 3 |
| 3 | OPP film | 20 | Polyurethane anchor coat | 1.5 | 29 | 99.1 | 2 |
| 4 | O-PET film | 20 | Polyurethane anchor coat | 1 | 37 | 99.5 | 7 |
| 5 | O-PET film | 40 | Polyurethane anchor coat | 1 | 37 | 99.1 | 5 |
| 6 | PET bottle | 300 | Polyester anchor coat | 1.5 | 37 | 99.7 | 7 |
| 7 | O-Ny film | 20 | Polyurethane anchor coat | 2 | 44 | 98.9 | 3 |
| 8 | PP bottle | 500 | Polyurethane anchor coat | 2 | 37 | 99.5 | 5 |
| Com. Ex. 1 | O-PET film | 20 | Polyurethane anchor coat | 1.5 | 30 | 99.5 | 4 |

| | Coating solution | | | | Film forming condition | | | | |
|---|---|---|---|---|---|---|---|---|---|
| | Solvent | | | | | Drying | | Heat-treatment | |
| | Water content (%) | Alcohol | | Concentration[6] of the solution (%) | Temperature of the coating solution (°C.) | Temp. (°C.) | Time (min.) | Temp. (°C.) | Time (sec.) |
| | | Kind | content (%) | | Coating Means | | | | |
| 1 | 50 | i-PrOH*[1] | 50 | 18 | Dip coating | 30 | 90 | 5 | 140 | 20 |
| 2 | 45 | n-PrOH*[2] | 55 | 12 | Roller coating | 20 | 95 | 0.5 | 120 | 13 |
| 3 | 50 | EtOH*[3] | 50 | 7 | Roller coating | 20 | 90 | 1 | 115 | 20 |
| 4 | 45 | n-PrOH | 55 | 22 | Roller coating | 40 | 120 | 1 | 150 | 15 |
| 5 | 45 | tert-BuOH*[4] | 55 | 16 | Roller coating | 35 | 110 | 3 | 140 | 30 |
| 6 | 45 | iso-PrOH | 55 | 20 | Dip coating | 40 | 70 | 5 | 100 | 3 |
| 7 | 37 | MeOH*[5] | 63 | 10 | Roller coating | 20 | 90 | 2 | 160 | 5 |
| 8 | 40 | iso-PrOH | 60 | 7 | Dip coating | 45 | 85 | 5 | 110 | 10 |
| Com. Ex.1 | 50 | iso-PrOH | 50 | 18 | Dip coating | 25 | 90 | 5 | — | |

(Notes)
*[1]iso-Propyl alcohol
*[2]n-Propyl alcohol
*[3]Ethyl alcohol
*[4]tert-Butyl alcohol
*[5]Methyl alcohol
*[6]A concentration of the hydrolyzed ethylene-vinyl acetate copolymer in the coating solution

TABLE 2

| Ex. No. | $D_{1140}/D_{1090}$ | Haze value (%) | Oxygen transmittancy (cc/m$^2$ · 24 hr · atm) |
|---|---|---|---|
| 1 | 0.93 | 1.8 | 2.9 |
| 2 | 0.76 | 2.5 | 7.3 |
| 3 | 0.85 | 4.2 | 7.5 |
| 4 | 1.16 | 1.5 | 2.0 |
| 5 | 1.07 | 1.6 | 3.0 |
| 6 | 0.87 | 1.5 | 2.3 |
| 7 | 1.11 | 2.6 | 5.3 |
| 8 | 0.90 | 4.3 | 4.6 |
| Com. Ex. 1 | 0.62 | 1.8 | 5.9 |

In addition to the ingredients used in the Examples, other ingredients can be used in the Examples as set forth in the specification to obtain substantially the same results.

What we claim is:

1. A process for forming a film of hydrolyzed ethylene-vinyl acetate copolymer which comprises:
   coating a solution comprising a hydrolyzed ethylene-vinyl acetate copolymer to a substrate,
   drying the wet film at a temperature from about 60° C. to about 150° C. and
   subjecting the dried film to heat-treatment at a temperature of not less than 20° C. higher than the drying temperature,
   said obtained film being formed so as to have a ratio of absorbance at 1,140 cm$^{-1}$ to absorbance at 1,090 cm$^{-1}$ in infrared absorption spectrum of not less than 0.65.

2. The process of claim 1, wherein a solvent of said solution is a mixed solvent of propyl alcohol and water.

3. The process of claim 1, wherein said hydrolyzed ethylene-vinyl acetate copolymer has an ethylene content of 25 to 55% by mole and a degree of hydrolysis in vinyl acetate units of at least 90% by mole.

* * * * *